United States Patent [19]
Reiger

[11] Patent Number: 5,393,313
[45] Date of Patent: Feb. 28, 1995

[54] TRANSPLANTABLE NURSERY STOCK GROWING METHODS

[76] Inventor: Ralph E. Reiger, 7505 N. Broadway, Oklahoma City, Okla. 73116

[21] Appl. No.: 151,955

[22] Filed: Nov. 15, 1993

[51] Int. Cl.⁶ .................. A01B 79/00; A01G 23/02; A01G 23/04; A01G 9/02
[52] U.S. Cl. .................................. 47/58; 47/73; 47/76; 47/78
[58] Field of Search ............... 47/58, 58.01, 58.25, 47/58.26, 58.27, 73, 78, 76

[56] References Cited

U.S. PATENT DOCUMENTS

| | | | |
|---|---|---|---|
| 4,098,021 | 7/1978 | Gruber | 47/66 |
| 4,574,522 | 3/1986 | Reiger et al. | 47/78 |
| 4,884,367 | 12/1989 | Lawton | 47/78 |
| 4,888,914 | 12/1989 | Reiger | 47/78 |
| 4,941,282 | 7/1990 | Milstein | 47/58 |
| 5,103,588 | 4/1992 | Reiger | 47/78 |
| 5,167,092 | 12/1992 | Reiger | 47/78 |

*Primary Examiner*—David T. Fox
*Assistant Examiner*—Erich E. Veitenheimer
*Attorney, Agent, or Firm*—Dougherty, Hessin, Beavers & Gilbert

[57] ABSTRACT

Methods of growing transplantable nursery stock plants are provided wherein the root growths of the plants are controlled. The methods basically comprise forming a plurality of spaced holes in the ground and placing a porous fabric blanket over and into the holes whereby depressions in the blanket conform with the holes. The porous fabric blanket has sufficient strength to constrict penetrating roots whereby root growth below the blanket is restricted and enlarged root nodule formation and root branching are promoted within the depressions above the blanket. The depressions are filled with a growing medium, and a plant is planted and grown in each of the depressions. The plants are subsequently removed from the depressions for transplanting.

19 Claims, 1 Drawing Sheet

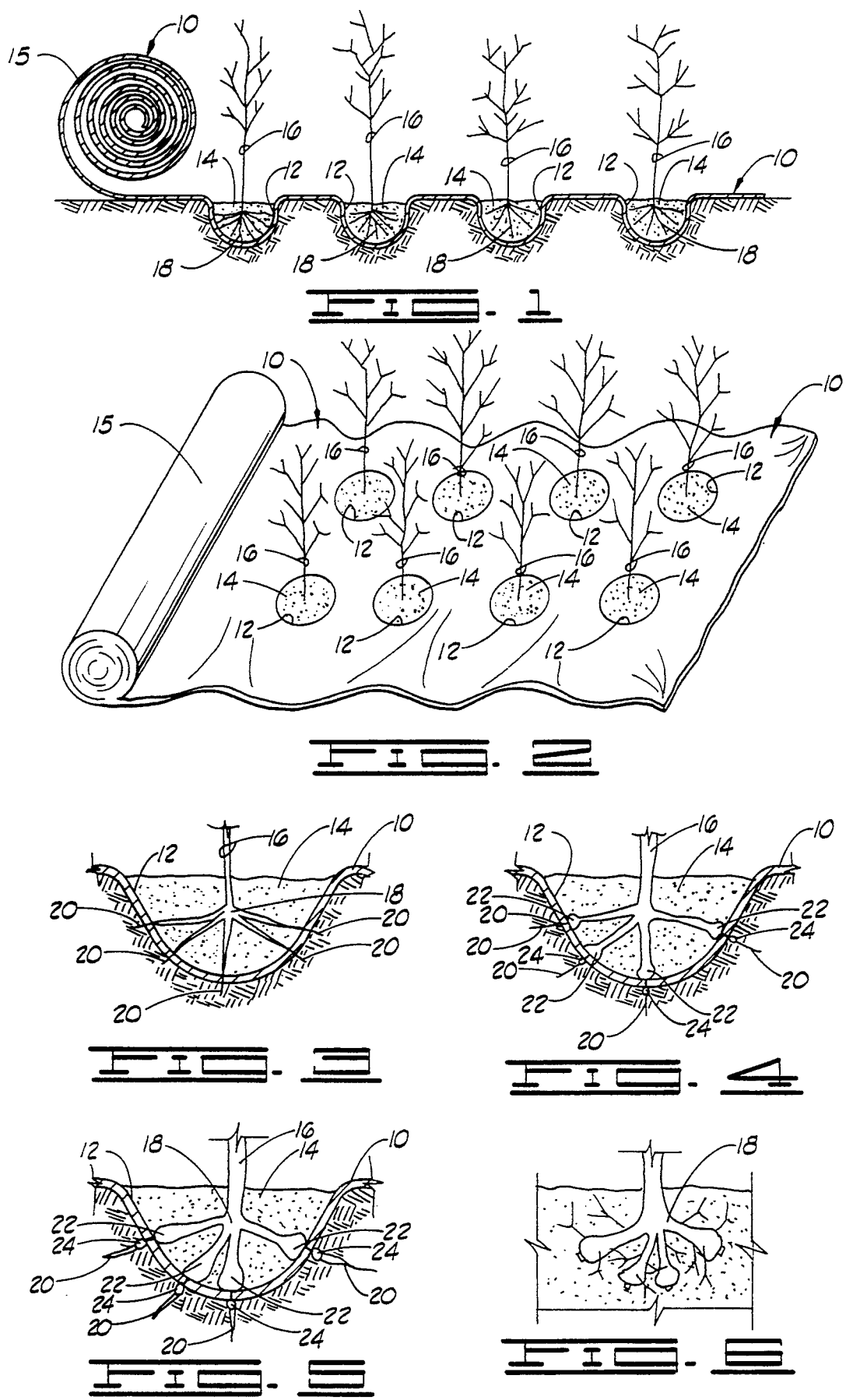

TRANSPLANTABLE NURSERY STOCK GROWING METHODS

BACKGROUND OF THE INVENTION

1. Field of the Invention

The present invention relates to improved methods of growing transplantable nursery stock, and more particularly, to such methods wherein the root growth of the nursery stock is controlled prior to transplanting the nursery stock.

2. Description of the Prior Art

The growing of nursery stock, such as trees and the like, in the ground has been a commercial practice for many years. The soil insulates the roots from high summer and low winter temperatures while maintaining the trees in an upright position without staking. However, once nursery stock is grown in the ground without confining its root growth, the root growth must be dug out of the ground which results in a number of the roots being cut. This in turn often causes the death or disatisfactory growth of the nursery stock after being transplanted.

Methods of growing nursery stock in the ground prior to transplanting the nursery stock whereby the root growth is controlled by confining it in porous fabric containers are disclosed in U.S. Pat. No. 4,574,522 to Reiger et al. dated Mar. 11, 1986, and in U.S. Pat. No. 4,888,914 dated Dec. 26, 1989 and U.S. Pat. No. 5,103,588 dated Apr. 14, 1992, both to Reiger. In accordance with the methods disclosed in such patents, nursery stock is confined within a porous fabric container and planted in the ground within the container prior to being transplanted. The porous fabric container has sufficient strength to constrict roots which penetrate it whereby the root growth outside the container is restricted and enlarged root nodule formation and root branching takes place within the container. Upon transplanting the nursery stock, the container and nursery stock are unitarily removed from the ground and the restricted root growth outside the container readily breaks off or comes out of the ground. The container is removed from the root ball prior to transplanting the nursery stock, and because of the nodule formation and root branching which took place in the container, the root ball rapidly regenerates whereby the plant is quickly nourished and anchored in the ground.

While the above described methods have achieved a high degree of commercial success, when the nursery stock being grown for transplantation is comprised of relatively small plants, placing each of such small plants in a separate fabric container or bag can be cost ineffective. Thus, there is a need for a less expensive method of growing transplantable nursery stock while controlling the root growth to achieve nodule formation and root branching prior to transplantation.

SUMMARY OF THE INVENTION

By the present invention improved methods of growing nursery stock for transplantation which meet the need described above and overcome the shortcomings of the prior art are provided. The methods basically comprise forming a plurality of spaced holes in the ground, and placing a porous fabric blanket over and into the holes whereby depressions in the blanket conform with the holes. The porous fabric blanket has sufficient strength to constrict penetrating roots whereby root growth below the blanket is restricted and enlarged root nodule formation and root branching are promoted within the depressions above the blanket. The depressions are filled with a growing medium and a plant is planted and grown in each of the depressions. When the plants are ready for transplantation, they are readily and easily removed from the depressions in the blanket.

It is, therefore, a general object of the present invention to provide improved transplantable nursery stock growing methods.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side partially cross-sectional view of nursery stock planted in depressions formed in a porous fabric blanket placed over and into holes in the ground in accordance with the method of this invention.

FIG. 2 is a perspective view of the nursery stock and porous fabric blanket of FIG. 1.

FIG. 3 is a partial cross-sectional view of a hole in the ground having a portion of a porous fabric blanket placed therein and having the root growth of a nursery stock plant growing in the depression formed in the blanket, the tips of the roots having been caught by the porous fabric.

FIG. 4 is a partial cross-sectional view similar to FIG. 3 showing the root growth of the nursery stock plant after initial growth and constriction by the porous fabric.

FIG. 5 is a partial cross-sectional view similar to FIGS. 3 and 4 showing the root growth after considerable additional growth whereby nodule formation and root branching has occurred as a result of the constriction by the porous fabric.

FIG. 6 is a partial side view of the root growth illustrated in FIGS. 3, 4 and 5 after it has been removed from the porous fabric blanket and the root growth has been transplanted.

DESCRIPTION OF PREFERRED EMBODIMENTS

Referring now to the drawings, and particularly to FIGS. 1 and 2, a rolled porous fabric blanket 10 is illustrated having a portion thereof placed over and into a plurality of spaced holes in the ground whereby depressions 12 are formed in the blanket 10. A growing medium 14, which can be soil or a synthetic growing medium, is placed in each of the depressions 12 in the blanket 10, and a nursery stock plant 16 is planted and grown in each of the depressions 12. The root growths 18 of the plants 16 are illustrated in FIG. 1 after the plants have been planted and grown for a period of time whereby roots have penetrated the porous fabric blanket 10. The roll 15 of the blanket 10 is unrolled as additional spaced holes are formed in the ground. Portions of the blanket are placed over and into the additional holes forming corresponding depressions in the blanket and additional growing medium and nursery stock plants are placed in the depressions.

The porous fabric blanket 10 has sufficient strength to constrict penetrating roots whereby root growth in the ground below the depressions 12 formed in the blanket 10 is restricted and enlarged root nodule formation and root branching are promoted within the depressions 12 above the blanket 10. Root constriction, root nodule formation and root branching are all described and claimed in U.S. Pat. No. 4,574,522 which is incorporated herein by reference.

After the nursery stock plants 16 have grown for the period of time required for root nodule formation and root branching to have occurred, the nursery stock plants 16 are removed from the depressions 12 in the blanket 10 and transplanted. Such removal can easily be accomplished because the very restricted roots beneath the blanket 10 are easily broken off or pulled out of the ground. The transplantation process is completed by transporting the nursery stock plants 16 to their new location and placing the noduled and branched root growth 18 in the ground or in a container such as a pot, box or the like. Because of the nodule formation and root branching which took place in the porous fabric depressions 12, the root growth 18 rapidly regenerates and expands after the plant is transplanted whereby the plant is quickly nourished and anchored in the ground or in a container.

A particularly suitable technique which can be utilized for quickly and easily removing the plants 16 from the ground and from the depressions 12 formed in the blanket 10 is to pull the blanket 10 in a direction whereby the blanket is straightened out. That is, by pulling the blanket substantially horizontally from one end, the depressions 12 in the blanket 10 are pulled out of the blanket which in turn causes the growing medium 14 and root growths 18 of the plants 16 to be moved upwardly and out of the holes in the ground. As mentioned, the root tips which penetrate the blanket 10 are very restricted and are easily broken off or pulled out of the ground when the blanket is pulled as described above.

As indicated above, the porous fabric of the blanket 10 must have sufficient strength to constrict penetrating roots whereby root nodule formation and root branching are promoted within the depressions formed in the blanket 10. In addition, the fabric must have the ability to capture growing root tips and cause the root tips to initially penetrate the fabric. Suitable porous fabrics for this purpose are those formed of staple or continuous fibers. The fibers are preferably polymeric plastic fibers which are needle punched whereby they are tangled and knotted. Also, to provide additional strength for constricting roots, the fibers are preferably bonded, e.g., by heat fusion. A particularly suitable such fabric is a nonwoven, needle punched and bonded fabric formed of polymeric thermoplastic staple fibers. Such staple fiber fabrics which are produced and sold by Phillips Fibers Corporation, a subsidiary of the Phillips Petroleum Company, are described in detail in U.S. Pat. No. 4,574,522 dated Mar. 11, 1986 referred to above and incorporated herein by reference. Other porous polymeric staple fiber fabrics can be utilized so long as they have sufficient strengths to constrict penetrating roots and readily capture root tips.

Another suitable porous fabric for use in accordance with the present invention is formed of continuous polymeric fibers which can be woven or nonwoven. The continuous fiber fabrics are preferably also needle punched to tangle and knot the fibers whereby they have root constricting strength. Also, as in the case of the staple fiber fabrics, the continuous fibers can be bonded, e.g., at least partially fused by heating, after being needle punched to provide extra strength thereto.

A particularly suitable uniform, porous, needle punched fabric formed of polymeric thermoplastic continuous fibers is manufactured by Polyfelt, Inc. of Evergreen, Alabama, under the trade designation "TS". Polyfelt TS600 is a 6-ounce continuous fiber, nonwoven, needle punched fabric, and Polyfelt TS650 is a 7-ounce continuous fiber, nonwoven, needle punched fabric, both of which are useful in accordance with the present invention. Other woven or nonwoven needle punched, continuous fiber fabrics can be utilized in accordance with this invention provided the strength and penetration requirements are met.

A particularly suitable porous fabric for carrying out the method of this invention is formed of continuous fibers which are woven to form a substrate, and prior to being needle punched, one or more layers of staple fibers are placed on the substrate. The staple fibers and substrate are then needle punched whereby the staple fibers are attached to one side of the substrate forming a root catching fuzzy surface thereon. When a blanket of the fabric is utilized in accordance with the method of this invention, the fuzzy surface is placed whereby it faces upwardly and the interior surfaces of the depressions formed in the blanket have the fuzzy root tip catching surface. A suitable fabric of the type described formed of staple fibers needle punched to a woven continuous fiber substrate is manufactured by the Polymers Group of Exxon Chemical Company. That fabric consists of a 3-ounce woven continuous fiber substrate having 3 ounces of staple fibers attached thereto.

The continuous and/or staple fibers utilized in forming the various porous fabrics described above are preferably selected from the group consisting of polyolefin fibers, polyester fibers, polyamide fibers and mixtures thereof. Most preferably the fibers are formed of polypropylene.

While the polymeric fiber fabrics described above are presently preferred for carrying out the methods of this invention, it is to be understood that any porous fabric having sufficient strength and root catching characteristics to catch and constrict the roots of nursery stock as described above can be utilized.

Referring now to FIGS. 3-5, one of the depressions 12 in the blanket 10 containing growing medium 14 and the root growth 18 of a plant 16 is shown. FIGS. 3, 4 and 5 illustrate the root growth 18 of a nursery stock plant 16 when the roots thereof initially contact and penetrate the blanket 10 (FIG. 3), after initial growth and constriction of the roots by the fabric of the blanket 10 (FIG. 4) and after full growth of the roots and constriction thereof by the fabric of the blanket 10 (FIG. 5).

Referring specifically to FIG. 3, when the root tips 20 of the root growth 18 contact the porous fabric of the blanket 10, they are caught and prevented from turning and sliding along the surface. Because the root tips 20 are of very small diameter and the fabric forming the blanket 10 is porous, the root tips 20 readily penetrate the blanket 10 as shown. As illustrated in FIG. 4, after an initial period of growth, the root tips 20 which penetrated the blanket 10 extend into the ground only a limited distance as a result of the porous fabric of the blanket 10 constricting the root tips 20. The roots of the root growth 18 within the depression 12, on the other hand, grow and enlarge thereby storing carbohydrates therein. The gurdling effect of the fabric forming the blanket 10 on the roots causes enlarged nodules 22 to form inside the depression 12 and smaller nodules 24 to form outside the depression 12. The restriction in the portions of the roots extending through the blanket 10 causes naturally weak structural points which readily break when the blanket 10 is removed from the ground. Additionally, the constriction of the root growth 18 induces root branching inside the depression 12 as shown in FIG. 5. When the root growth 18 has fully developed within the confines of the depression 12 in the blanket 10, the root growth 18 and nodules 22 thereof are enlarged as are the branched roots growing therefrom and a large number of fibrous feeder roots are available for reestablishing the plant after being transplanted.

As shown in FIG. 6, which illustrates the root growth 18 after the plant 16 has been transplanted, the branched roots quickly extend into the surrounding soil thereby rigidly attaching the plant in the ground and providing water and nutrients to the plant.

Thus, the present invention is well adapted to carry out the objects and attain the ends and advantages mentioned as well as those inherent therein. While numerous changes in the steps of and fabric utilized in accordance with the methods of this invention can be made by those skilled in the art, such changes are encompassed within the spirit of this invention as defined by the appended claims.

What is claimed is:

1. An improved method of growing nursery stock for transplantation wherein the root growth of the nursery stock is controlled comprising the steps of:
   (a) forming a plurality of spaced holes in the ground;
   (b) placing a porous fabric blanket over and into said holes whereby depressions in said blanket conform with said holes, said porous fabric blanket being formed of polymeric plastic fibers and having sufficient strength to constrict penetrating roots whereby root growth below said blanket is restricted and enlarged root nodule formation and root branching are promoted within said depressions above said blanket;
   (c) filling said depressions with a growing medium;
   (d) discretely planting and growing a plant in each of said depressions; and
   (e) subsequently removing said growing plants from said depressions for transplanting.

2. The method of claim 1 wherein step (e) is performed by pulling said porous fabric blanket in a direction whereby said blanket, said growing medium and said growing plants are removed from said holes.

3. The method of claim 1 wherein said porous fabric blanket comprises nonwoven staple fibers.

4. The method of claim 1 wherein said porous fabric blanket comprises nonwoven continuous fibers.

5. The method of claim 1 wherein said porous fabric blanket comprises woven continuous fibers.

6. The method of claim 3, 4 or 5 wherein said fibers are needle punched.

7. The method of claim 3, 4 or 5 wherein said fibers are thermoplastic and are heat fused.

8. The method of claim 3, 4 or 5 wherein said fibers are thermoplastic, needle punched and heat fused.

9. The method of claim 1 wherein said porous fabric blanket comprises continuous fibers having staple fibers attached to a side thereof by needle punching whereby said blanket has a fuzzy surface which causes roots to be caught and readily initially penetrate said blanket prior to being constricted by said blanket.

10. The method of claim 3, 4 or 5 wherein said fibers are selected from the group consisting of polyolefin fibers, polyester fibers, polyamide fibers and mixtures thereof.

11. An improved method of growing readily transplantable nursery stock wherein the root growth of the nursery stock is controlled comprising:
   (a) forming a plurality of spaced holes in the ground;
   (b) placing a porous fabric blanket over and into said holes whereby depressions in said blanket conform with said holes, said porous fabric blanket being formed of polymeric plastic fibers and having sufficient strength to constrict penetrating roots whereby root growth below said blanket is restricted and enlarged root nodule formation and root branching are promoted within said depressions above said blanket;
   (c) filling said depressions with a growing medium;
   (d) discretely planting and growing a plant in each of said depressions; and
   (e) subsequently removing said growing plants from said depressions for transplanting by pulling said porous fabric blanket in a direction whereby said blanket, said growing medium and said growing plants are removed from said holes and said growing plants are removed from said blanket.

12. The method of claim 11 wherein said porous fabric blanket comprises nonwoven, polymeric plastic staple fibers.

13. The method of claim 11 wherein said porous fabric blanket comprises nonwoven, polymeric plastic continuous fibers.

14. The method of claim 11 wherein said porous fabric blanket comprises woven, polymeric plastic continuous fibers.

15. The method of claim 12, 13 or 14 wherein said fibers are needle punched thermoplastic fibers which are heat fused.

16. The method of claim 12, 13 or 14 wherein said fibers are selected from the group consisting of polyolefin fibers, polyester fibers, polyamide fibers and mixtures thereof.

17. The method of claim 12, 13 or 14 wherein said fibers comprise polypropylene fibers.

18. The method of claim 1 in which step (e) comprises: simultaneously removing said fabric blanket from said holes
and said growing plants from said fabric blanket.

19. The method of claim 11 in which step (e) comprises:
simultaneously removing said fabric blanket from said holes and said growing plants from said fabric blanket.

* * * * *